June 22, 1937.   C. G. KEITH   2,084,585
AUTOMATIC SPRINKLER
Filed Aug. 22, 1934   2 Sheets-Sheet 1
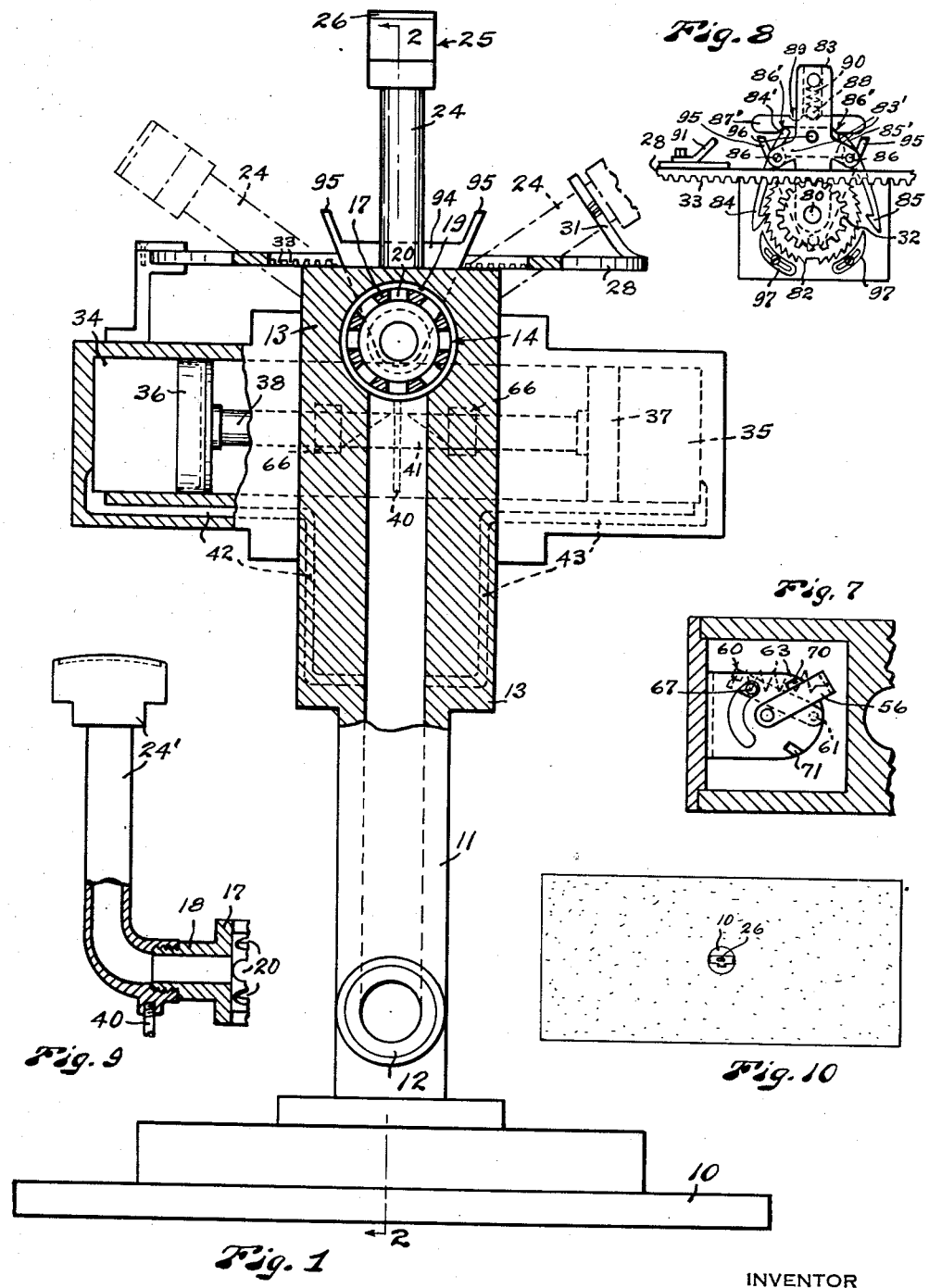
INVENTOR
Clinton G. Keith
BY
Fred C. Matheny
ATTORNEY

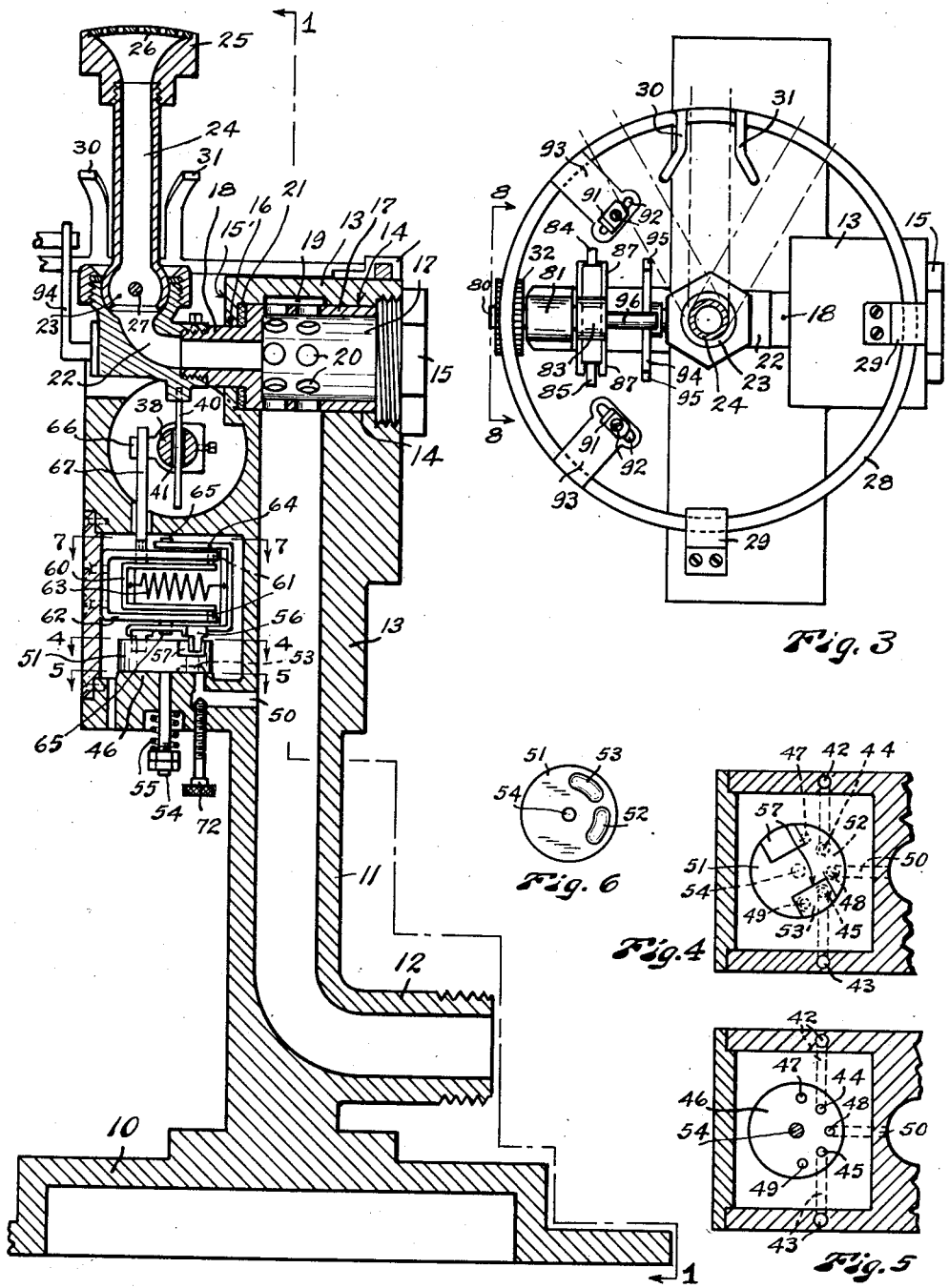

Patented June 22, 1937

2,084,585

UNITED STATES PATENT OFFICE 2,084,585

AUTOMATIC SPRINKLER

Clinton G. Keith, Yakima, Wash.

Application August 22, 1934, Serial No. 740,941

2 Claims. (Cl. 299—66)

This invention relates to improvements in automatic water sprinklers and the general object of this invention is to provide an automatic water sprinkler of this nature having a spray nozzle mounted for oscillatory movement and adapted to sprinkle water over a substantially rectangular area when in operation.

Another object of the invention is to provide a lawn sprinkler having a nozzle mounted for oscillation in one direction and arranged to be automatically adjusted in a direction at right angles to its direction of oscillation, whereby the area covered at one setting of the sprinkler may be varied and at the same time the rectangular shape of the sprinkled area maintained.

Another object of the invention is to provide an oscillatory spray nozzle of simple and efficient construction, in combination with a reciprocable water motor connected with the nozzle for oscillating the same and arranged to be driven by the pressure of the water which is being supplied to the spray nozzle.

Other and more specific objects of the invention will be apparent from the following description taken in connection with the accompanying drawings.

In the accompanying drawings Figure 1 is a vertical sectional view, with parts shown in elevation, substantially on a broken line 1—1 of Fig. 2, of a sprinkler constructed in accordance with my invention.

Fig. 2 is a vertical sectional view of the same substantially on a broken line 2—2 of Fig. 1.

Fig. 3 is a plan view on a reduced scale looking down on top of the sprinkler, the base portion being omitted.

Fig. 4 is a fragmentary sectional view of the valve mechanism taken substantially on broken line 4—4 of Fig. 2.

Fig. 5 is a fragmentary sectional view of the valve mechanism taken substantially on broken line 5—5 of Fig. 2, showing the lower fixed valve member in plan.

Fig. 6 is a detached inverted plan view of the upper valve disc.

Fig. 7 is a detached plan view of the valve throw mechanism for throwing the valve from one operative position to another with a quick snappy movement.

Fig. 8 is a fragmentary front elevation, on line 8—8 of Fig. 3, of parts of the sprinkler head adjusting mechanism.

Fig. 9 is a detached elevation of a modified form of nozzle, parts being shown in section.

Fig. 10 is a plan view on a small scale illustrating the shape of a patch of ground which may be covered by a single setting of this sprinkler.

Like reference numerals designate like parts throughout the several views.

Referring to the drawings 10 designates a base having an upright tubular stem 11 provided with means 12 for connection with a hose, not shown, or other suitable source of supply of water under pressure. At the upper end of the stem 11 is an enlarged housing portion 13 having a transverse cylindrical recess 14 provided therein. A removable cap 15 having threaded engagement with the housing portion 13 serves as a closing means for one end of the recess 14. The other end of the housing portion 13 is partially closed by an integral wall 15' which has an opening 16 therethrough of smaller diameter than the cylindrical recess 14 and positioned coaxially as respects said cylindrical recess. A hollow cylindrical member 17 is disposed within the recess 14. A tubular portion 18 of smaller diameter than member 17 is provided coaxially on the end thereof adjacent the wall 15' and extends out through the opening 16. Holes 20 are provided in the member 17 to afford communication between the interior of the member 17 and the water passageway in the stem 11 and the housing 13 may be recessed around the holes as at 19. A gasket 21 may be provided between the front end of the member 17 and the wall 15' forward thereof to prevent leakage. When water under pressure is present in hollow member 17 the pressure of such water on the end thereof adjacent the gasket 21 will keep the member 17 pressed closely against the gasket 21 and leakage will be prevented. The reaction of the water at the other end of the member 17 will be against the cap 15.

Externally of the housing 13 the tubular member 18 is connected with an elbow shaped member 22 into which is fitted a hollow ball 23 on the bottom end of an upwardly extending pipe 24. An enlarged nozzle portion 25 is preferably detachably secured to the upper end of the pipe 24, said nozzle having an upper end 26 suitably shaped and perforated to provide a spray of water therefrom. The nozzle assembly including 17—18—22—23—24—25 and 26 is adapted to be oscillated back and forth on the axis of the tubular members 17 and 18 and a pin 27 extends through the ball 23 and socket 22 in the general direction of the oscillatory movement of the pipe 24 so that the pipe 24 and spray nozzle 25—26 will be oscillated in the longitudinal direction of the pin 27 by the oscillation of the tubular parts 17 and 18 and may be angularly adjusted by an automatic step by step movement in a direction at right angles to the direction of the pin 27. This adjustment of the nozzle pipe 24 in a direction at right angles to its direction of oscillation provides for spraying a wider area than could be sprayed with a like nozzle not having this adjustment. However I also provide for the use of a nozzle 24', of the form shown in Fig. 9, which does not have this adjustment.

The adjustment provided for by this ball and socket joint 23—22 is in a direction at right angles to the plane of oscillating movement of the pipe 24. This adjustment is accomplished by means shown in Figs. 1, 2, 3, and 8. This adjusting means comprises a ring 28 slidably mounted in guide members 29 which are secured to fixed parts of the sprinkler frame, said guide members supporting the ring 28 so that it may be moved angularly. Two spaced apart arms 30 and 31 are provided on the ring as shown in Figs. 1 and 3. The ends of these arms 30 and 31 are inclined or curved outwardly away from each other and are adapted to engage with the pipe 24 and move the said pipe sidewise as said pipe is received between the arms 30 and 31 near one end of its stroke. By moving the ring 28 rotatively it is thus possible to adjust the position of the nozzle pipe 24 by causing said pipe to be deflected sidewise each time it encounters the inclined end of one of the members 30 or 31. I preferably provide mechanism for moving the ring back and forth through an angle sufficient to secure any desired adjustment of the pipe 24. This ring moving mechanism, see Figs. 3 and 8, is preferably in the form of a pinion 32 meshing with gear teeth 33 on the ring 28. The pinion 32 is rigid with a shaft 80 which is journaled in bearings 81. A ratchet wheel 82 is secured to shaft 80 and a lever member 83 is mounted for oscillation on said shaft 80. Two pawls 84 and 85 connected by pivots 86 with arms 83' of the lever member 83 are arranged to engage with suitable teeth on the ratchet wheel 82 in such a manner that the ratchet wheel 82 may be moved rotatively in either direction by oscillation of the lever 83. If desired two ratchet wheels may be provided. The pawls 84 and 85 each have an extension 84' and 85' respectively beyond the pivot of the pawl adapted to be engaged by cam means 86' on a bar 87 which is slidable crosswise through lever arm 83. When this bar 87 is at the limit of its movement in one direction one of the pawls 84 or 85 will be held free of the ratchet wheel but the other pawl will be allowed to engage with the teeth of the ratchet wheel, and oscillation of the lever 83 will move the ratchet wheel rotatively in one angular direction. In a similar manner when the bar 87 is at the limit of its movement in the opposite direction the engaged and disengaged positions of the respective pawls as respects the ratchet wheel teeth will be reversed and oscillation of lever 83 will move the ratchet wheel in a reverse angular direction. Angular movement of the ratchet wheel 82 will move the pinion 32 and angularly adjust the position of the ring 28. The bar 87 may be yieldingly held at the limit of its movement in either direction by a ball like detent member 88 adapted to seat within suitable notches 89 in the bar 87 and yieldingly urged against said bar 87 by a spring 90. Stop members 91, adjustably secured as by slot and pin means 92, to a plate 93 which is carried by the ring 28 are provided for engagement by the bar 87 whereby said bar may be shifted from one position to the other. The lever 83 will always oscillate in the same plane and the bar 87 will not encounter the stop members 91 except when the limit of angular movement of the ring 28 has been reached, at which time a stop member 91 will be moved into the path of the bar 87 and said bar 87 will be shifted endwise to reverse the position of the pawls 84 and 85 as respects relative engagement and disengagement of the ratchet wheel 82, thus causing the angular direction of movement of the ring 28 to be reversed. This will reverse the direction of angular movement of the nozzle pipe 24 about the axis of pin 27. The lever arm 83 may be oscillated through any desired angle by a forked lever 94 which is secured to, and extends upwardly from the elbow member 22. This forked lever 94 has means, as lugs 95, adapted to engage with a pin 96 of the lever arm 83. This affords some lost motion so that the lever arm 83 need not be moved through as great an angle as the lever 94. Adjustable deflector members 97 are provided adjacent the periphery of the ratchet wheel 82 for engagement by the pawls 84 and 85. When one of the pawls 84 or 85 encounters one of these deflectors as it slides over the ratchet teeth preparatory to engaging with said ratchet teeth and turning the ratchet wheel it will be deflected and held out away from the ratchet teeth and may thus be caused to idle on a portion of its return stroke before it grips the teeth of the ratchet wheel thus moving the ratchet wheel through a less angular distance than it would had the deflector not been provided. It is thus apparent that the amount of angular movement imparted to the ratchet wheel 82 at each stroke of the lever arm 83 may be varied by adjusting the position of one or both of the deflector members 97.

By the use of the adjusting means just hereinbefore described it is possible to adjust the nozzle pipe step by step from one side to the other of a vertical plane and this adjustment is in a direction at right angles to the general direction of oscillation of the same. This adjustment is accomplished by moving the ring 28 a small amount each time the nozzle makes a complete back and forth stroke thus changing the position of the members 30 and 31. As the nozzle pipe 24 encounters the inclined end of one of the members 30 or 31 it will be shifted slightly to one side and will retain its shifted position due to friction in the ball and socket joint. When the ring 28 has been shifted far enough in one direction one stop member 91 will be moved into the path of the bar 87 and said bar will be moved from one operative position to another thereby lifting one pawl 84 or 85 clear of the teeth of the ratchet wheel and allowing the other pawl to engage the teeth of said ratchet wheel. This will reverse the direction of rotation of the ratchet wheel 82 thus reversing the direction of angular movement of the ring 28 and moving the nozzle pipe 24 in an opposite direction. By thus adjustably moving the nozzle pipe 24 as it is oscillated back and forth it is possible to sprinkle a wider strip at each setting of the sprinkler.

The nozzle pipe and parts connected therewith are oscillated on the axis of the tubular parts 17 and 18 by a motor operated by water pressure. This motor includes two cylinders 34 and 35 formed in the frame portion 13. Two pistons 36 and 37 are reciprocably disposed in the cylinders 34 and 35 respectively and are rigidly connected with each other by a piston rod 38. A pin 40 secured to the socket member 22 extends downwardly through a slot 41 in the piston rod 38. As the pistons 36—37 are reciprocated in their cylinders the pin 40 will be moved back and forth angularly and the sprinkler pipe 24 will be oscillated.

Water under pressure for moving the pistons 36 and 37 is admitted to and discharge from the cylinders 34 and 36 through two conduits 42 and 43 which connect respectively with the outer end portions of the cylinders 34 and 35. These conduits act alternately as inlet and exhaust passageways. The inner ends of the conduits 42 and 43 are connected respectively with ports 44 and 45 in a non-movable valve member 46. This valve member 46 is further provided with two water outlet ports 47 and 49 which may permit the escape of water downwardly, and is further provided with a water inlet port 48 connected by a conduit 50 with the main water conduit 11. A valve disc 51 having two cavities 52 and 53 therein is mounted on an axis 54 for oscillatory movement in face to face contact with the valve member 46. Spring member 55 on axial pivot member 59 urges the valve disc 51 into water tight engagement with the fixed valve member 46. A yoke 56 having arms positioned in notches 57 in the valve disc 51 is provided for angularly moving the disc 51 back and forth. The notches 57 afford lost motion desirable in the yoke and of use in imparting quick movement to the valve disc 51. When the valve disc 51 is turned into the position shown in Fig. 4, so that the cavity 52 connects ports 44 and 48 and the cavity 53 connects ports 45 and 49 then water under pressure will be admitted through port 48, cavity 52, port 44 and conduit 42 to the outer end of the cylinder 35 and will move the piston assembly 37—38—36 toward the left, as seen in Fig. 1, thus swinging nozzle pipe 24 toward the right. At the same time water from the cylinder 34 will escape or exhaust through conduit 43, port 45, cavity 53 and port 49. At the instant the piston assembly reaches the end of its stroke the valve disc 51 will be moved by a snappy movement so that cavity 52 overlaps ports 44 and 47 and cavity 53 overlaps ports 45 and 48 thus reversing the connections of cylinders 34 and 35 as respects inlet and exhaust of water and causing the piston assembly to be moved back toward the outer end of cylinder 35. In this manner a small amount of the water under pressure is taken off from the main conduit 11 and used for angularly moving the nozzle member 24—25 from which the main supply of water is being sprayed.

Movement of the yoke 56 which angularly moves the valve disc 51 may be controlled by spring mechanism which trips after passing a predetermined point to make this valve movement quick and snappy. This mechanism may comprise a U shaped lever arm 60 pivoted at 61 in a forked bracket 62 and actuated by a tension spring 63. One end of tension spring 63 is connected to the lever arm 60 and the other end of said spring is connected with an oscillatory bracket 64 which is rigidly secured to, and may be integral with, the yoke 56. The oscillatory bracket 64 is fulcrumed on pivots 65 which are secured to the fixed forked bracket 62. Two valve trip members 66 adjustably connected with the piston rod 38 may engage with a projection 67 on the end of the lever arm 60 and move said lever arm back and forth. The means for moving this lever arm 60 is arranged so that the line of pull of the spring 63 will move in one direction across the center line of the pivot means 61, when the piston assembly is substantially the limit of its movement in one direction thus causing the oscillatory bracket 64 together with the yoke 56 to be snapped in one direction and move the valve disc 51 to one operative position. When the piston assembly is substantially at the limit of its movement in the other direction the line of pull of the spring 63 will be moved in the other direction across the center line of the pivot means 61 and the oscillatory bracket 64, together with the yoke 56 and valve disc 51 moved by a quick snappy movement in the other direction. This reverses the position of the valve as respects inlet and exhaust positions of the two cylinders thereby reversing the direction of travel of the pistons. Stop means 70—71 may be provided for limiting the oscillatory movement of the valve disc 51, yoke 56 and bracket 64 in both directions.

A valve member 72 is preferably provided in the conduit 50 which admits water from the source of supply conduit 11 to the valve disc 51 whereby the amount of water thus supplied for motive purposes may be regulated and the speed of oscillation of the spray pipe 24 thus varied.

The mode of operation of this device has been extensively described in connection with the construction of the same. This mode of operation may be summarized as follows:

The sprinkler is set up at the center of any rectangular area 73 which it is desired to sprinkle as indicated in Fig. 10. A hose leading to a source of supply of water under pressure is connected with the boss 12 of the conduit stem 11 to admit water under pressure. This water will pass upwardly through conduit members 17, 18, 24, and 25 and will be sprayed from the perforated plate 26, at the same time water under pressure will flow through the conduit 50 to the valve port 48 and thence through conduit 42 or 43 to one of the cylinders 34 or 35. This will move the piston assembly reciprocably within the cylinders and oscillate the nozzle assembly in such a manner as to spray a rectangular area. The valve operating mechanism is tripped automatically each time the piston assembly reaches one end of the cylinders 34—35, thus keeping the pistons moving and the nozzle assembly oscillating as long as water is supplied. If the nozzle assembly is adjusted transversely to its direction of oscillation by the step by step adjustment means controlled by members 30 and 31 then a wider strip may be sprinkled at one setting. As this sprinkler will sprinkle a rectangular or square area it is possible with the same to sprinkle evenly along a property line or to sprinkle evenly into a corner or along the side of a building without sprinkling water where it is not desired. This economizes on water and avoids sprinkling water on the property of other people and in like places where the sprinkling may be objectionable.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In an automatic sprinkler, a sprinkler pipe mounted for oscillation in a substantially vertical plane; oscillating means connected with said sprinkler pipe; water supply conduit means connected with said sprinkler pipe; ball and socket joint means in said sprinkler pipe permitting angular adjustment of said sprinkler pipe in directions at substantially right angles to the direction of oscillation of said sprinkler pipe; a sprinkler pipe adjusting member positioned in the path of movement of said sprinkler pipe and having two oppositely inclined surface portions positioned with their contact faces toward each other arranged to be contacted by said sprinkler pipe; and actuating devices connected with said sprinkler pipe adjusting member for moving said sprinkler pipe adjusting member into different adjusted positions whereby said sprinkler pipe may be moved angularly in directions transverse to the direction of oscillation of said pipe.

2. In an automatic sprinkler, an upright support having a water conduit therein; an enlarged housing portion at the upper end of said support, having a transverse cylindrical recess communicating with said water conduit and having two relatively aligned cylinders positioned at right angles to and below the axis of said cylindrical recess; a perforated tubular member rotatively mounted in said cylindrical recess; a coaxial tubular portion of smaller diameter on the end of said perforated tubular member extending outwardly through the wall of said housing portion; an elbow member secured to said smaller tubular portion, a sprinkler pipe; ball and socket joint means connecting said sprinkler pipe with said elbow member; inclined sprinkler pipe adjusting means positioned for direct engagement by said sprinkler pipe providing adjustment of said sprinkler pipe on said ball and socket joint means; devices actuated by said sprinkler pipe for positioning said inclined sprinkler pipe adjusting means, a sprinkler head on the upper end of said sprinkler pipe; and reciprocable piston means in said two cylinders connected with said sprinkler pipe for oscillating said pipe.

CLINTON G. KEITH.